(12) United States Patent
Belley et al.

(10) Patent No.: US 7,666,248 B2
(45) Date of Patent: Feb. 23, 2010

(54) METHOD OF PRIMING FILTER FOR MOLTEN METAL

(75) Inventors: Luc Belley, Jonquière (CA);
Jean-François Bilodeau, Jonquière (CA); André Gendron, Jonquière (CA);
Serge Munger, Laterriere (CA)

(73) Assignee: Alcan International Limited, Montreal, Quebec (CA)

( * ) Notice: Subject to any disclaimer, the term of this patent is extended or adjusted under 35 U.S.C. 154(b) by 273 days.

(21) Appl. No.: 10/590,472

(22) PCT Filed: Feb. 23, 2005

(86) PCT No.: PCT/CA2005/000248

§ 371 (c)(1),
(2), (4) Date: Oct. 12, 2007

(87) PCT Pub. No.: WO2005/080028

PCT Pub. Date: Sep. 1, 2005

(65) Prior Publication Data

US 2008/0053275 A1    Mar. 6, 2008

(51) Int. Cl.
*C22B 9/02* (2006.01)
(52) U.S. Cl. .............................. 75/407; 266/227; 266/89
(58) Field of Classification Search ................... 75/407; 266/227, 89
See application file for complete search history.

(56) References Cited

U.S. PATENT DOCUMENTS 3,661,373 A    5/1972  Cheltsov
4,817,918 A *  4/1989  Mochizuki et al. ............ 266/87
5,427,602 A    6/1995  DeYoung et al.

(Continued)

FOREIGN PATENT DOCUMENTS

DE          853 972  C       10/1952

(Continued)

OTHER PUBLICATIONS

Int'l Search Report for PCCT/CA2005/000248, dated Jun. 13, 2005.

*Primary Examiner*—George Wyszomierski
*Assistant Examiner*—Tima M McGuthry-Banks
(74) *Attorney, Agent, or Firm*—RatnerPrestia

(57) ABSTRACT

A method is described for priming an in-line molten metal filtration unit having a porous ceramic or refractory filter mounted substantially horizontally in a filter box. This filter box has an inlet for molten metal and an outlet for molten metal, the outlet being a closeable outlet in an exit well connecting to the downstream side of the filter. The method of the invention comprises the steps of adding a molten metal to the filter box sufficient to entirely cover the upstream side of the filter with a depth of molten metal and temporarily sealing the outlet in the exit well. A steadily increasing vacuum is then applied to the closed exit well at a rate between 0.1 and 10 kPa per second by withdrawing a stream of air from the exit well by means of a fan or air venturi until molten metal begins to flow through the filter. At that point the vacuum is quickly released and the molten metal outlet is opened. Once the filter has been primed in this manner, flow of metal through the filter continues while requiring only a relatively low head of molten metal on the inlet side of the filter.

25 Claims, 5 Drawing Sheets

U.S. PATENT DOCUMENTS 5,673,902 A 10/1997 Aubrey et al.
5,827,982 A 10/1998 Doutre et al.

FOREIGN PATENT DOCUMENTS

| DE | 877 958 C | 5/1953 |
| JP | 60 005829 | 1/1985 |
| JP | 61 243133 A | 10/1986 |
| JP | 06-49551 | 2/1994 |
| WO | WO 88/07165 | 9/1988 |
| WO | WO 3033748 A1 * | 4/2003 |

* cited by examiner

METHOD OF PRIMING FILTER FOR MOLTEN METAL

TECHNICAL FIELD

This invention relates to the filtration of molten metal, e.g. molten aluminum.

BACKGROUND ART

It is a common industrial practice to remove small inclusions from molten metals, such as molten aluminum, by filtration. A typical material used for such filters is a porous ceramic or refractory material through which the molten metal is passed. These ceramic or refractory materials are not readily wetted by molten metals, and when such materials have relatively fine pore sizes, considerable difficulties are encountered in initiating the flow of metal through the filter (priming the filter) and typically such materials require the use of deep filter boxes to create a metal head sufficient to overcome the priming difficulties that arise. Fine pore size versions of these filter materials have recently been developed by various manufacturers to improve filter efficiency and priming difficulties limit their usefulness.

One solution to this problem has been proposed in Japanese Patent Publication JP 60-5829 that teaches the use of a vacuum hood to prime a filter for filtering molten metal for use in producing ultra-pure metal. It had been found that with filters having small pore sizes, a substantial gauge pressure of metal is needed to prime the filter (in an example, gauge pressures of up to about an atmosphere are indicated). According to this Japanese publication, a vacuum was produced by a vacuum pump connected to a buffer volume via a conduit to a vacuum hood. The vacuum pump was used to evacuate the buffer volume which was then applied to the filter on its downstream side. A rapid vacuum release valve was provided to cut off the vacuum once priming had occurred.

In Japanese Patent Publication JP 06-49551 there is disclosed a continuous in-line filter device, based on a porous tube filter where a fan was used to force the metal that is passed through the filter element from the tube outlet. The fan operates only to blow and does not provide any suction.

A furnace stirring device is described in WO 88/07165 in which a molten metal in a closed side chamber was raised and lowered repeatedly to cause the metal to flow through shaped orifices and thereby cause mixing in the main furnace. The metal was raised and lowered by the alternate application of pressure and suction by a fan operating on the gas above the metal in the closed side chamber. There was no suggestion of the use of such a fan with a filter.

The present inventors were faced with the problem of trying to prime a relatively large commercial filter typically having a relatively large cross sectional area compared to its thickness. Such a filter has a relatively large exit well and it was found that a system such as that described in the JP 60-5829 document was not suitable. For instance, it was found that for the level of vacuum required in the JP 60-5829 system, a vacuum pump was needed and a typical vacuum pump is not able to remove air from a commercial exit well sufficiently fast. For a commercial operation with the larger filter, the need was not so much for a high level of vacuum but for being able to remove the air from the exit well at a sufficiently high rate.

Priming a commercial metal filter of substantial cross-section, particularly those having fine pore size, is a complex technical problem. If a vacuum is applied at a rate outside certain limits, the priming fails. If a rate of vacuum application is too large, the filter element can rupture. On the other hand, if the rate of application is too low, when the vacuum reaches a certain critical level, the filter element may become primed only in a few locations, causing metal to start flowing through the filter only at those locations. When that happens, the vacuum that was developed is released so that the filter is no longer primed and there is no metal flow through the unprimed areas. The resulting filtration area is substantially reduced resulting in poorer filtration, increased metal level drop through the filter and in certain cases requiring that the process be halted.

Attempts were made to use a vacuum tank such as that shown in JP 60-5829, with the tank sized to contain sufficient gas volume at the final desired pressure which was by a separate vacuum pump prior to establishing a connection to the filter, and differed from the reference in that the vacuum pump was disconnected from the tank prior to connecting to the system. Apart from the need of a large vacuum tank, this approach also tended to create an uncontrollable, and an initially high, evacuation rate, and if the system was not leak tight could result in insufficient final pressure to permit priming. It was not found to be a satisfactory arrangement for a large commercial filtering operation.

It is an object of the present invention to provide a priming system which could be adapted for use for large commercial filters for which the pore size is too small to permit priming in shallow filter boxes.

DISCLOSURE OF INVENTION

In one aspect, the present invention relates to a method of priming an in-line molten metal filtration unit having a porous ceramic or refractory filter mounted substantially horizontally in a filter box. This filter box has an inlet for molten metal and an outlet for molten metal, the outlet being a closeable outlet in an exit well connecting to the downstream side of the filter. The method of the invention comprises the steps of adding a molten metal to the filter box sufficient to entirely cover the upstream side of the filter with a depth of molten metal and temporarily closing the outlet in the exit well with a sealable cover. A steadily increasing vacuum is then applied to the closed exit well at a rate between 0.1 and 10 kPa per second by withdrawing a stream of air from the exit well by means of a fan until molten metal begins to flow through the filter. At that point the vacuum is quickly released and the sealable cover is removed from the molten metal outlet. Once the filter has been primed in this manner, flow of metal through the filter continues while requiring only a relatively low head of molten metal on the inlet side of the filter.

The use of a fan in the above manner has been found to have several important advantages. Firstly, a vacuum tank is not required and the fan is capable of removing air from the exit well very rapidly so that the level of vacuum required for priming of the filter is reached very quickly. Secondly, by a direct connection to a fan, it is possible to very quickly release the vacuum without any overrun when priming is achieved.

In an alternative embodiment of the invention it is possible to use an air venturi in place of the fan and achieve similar results.

The invention also relates to a novel apparatus for filtering molten metal. This apparatus includes a filter box, a feed trough for feeding molten metal into the filter box and a porous ceramic or refractory filter mounted substantially horizontally within the filter box to receive molten metal from the feed trough. An exit well is located beneath the filter for receiving filtered molten metal. This exit well also extends laterally beyond the filter box and beneath a bottom portion of discharge trough. An opening in the discharge trough bottom portion connects to the exit well so that filtered molten metal can flow from the exit well into the discharge trough. A vertically movable closure unit is adapted to sit over and seal the opening between the discharge trough and the exit well. An air conduit is connected at a first end to the closure unit and at a second end to a fan or air venturi for withdrawing air from the exit well. The apparatus also includes means for raising and lowering the closure unit and a valve for releasing vacuum formed within the exit well.

BRIEF DESCRIPTION OF DRAWINGS

In the drawings which illustrate the present invention.

BEST MODES FOR CARRYING OUT THE INVENTION

It is important for the control of the vacuum according to the present invention that the amount of vacuum increases steadily. In other words, from the start of priming to the point at which the vacuum is released, there is no decrease in vacuum. A steady increase may be in the form of a series of step increases or as a straight line increase.

The fan used for priming is preferably connected to the exit well by means of a conduit having a valve venting to the atmosphere. Thus, when the vacuum is to be released, this valve is opened to the atmosphere.

The fan requirements will depend on the size of filter used but typically should be capable of evacuating to a vacuum of between 2 and 20 kPa, and to evacuate the filter outlet volume to the desired vacuum within about 1 to 120 seconds, preferably 2 to 30 seconds. A vacuum of 2 to 20 kPa means 2 to 20 kPa below the standard atmospheric pressure (101 kPa). Typically the type of fan that meets these requirements is a duct fan or regenerative blower. However any fan meeting these requirements may be used. An air venturi sized to these requirements may also be used. A fan suitable for typical commercial filter installations and meeting the above requirements has an exhaust rate of 320 standard litres per minute at 6 kPa of vacuum.

It is also advantageous to connect the fan conduit to the exit well by way of a closure member which closes the exit well, including the molten metal outlet. Thus, when the closure member is in place, the exit well and outlet are sealed from the atmosphere. This closure member is adapted so that when the vacuum is released, the closure member may be lifted from the top of the exit well and from the trough so that the exit well is immediately returned to atmospheric pressure and the trough is open to receive filtered molten metal.

The fan may be equipped with a variable speed control to permit ramping the evacuation rate smoothly, but in a preferred embodiment, the conduit may also include a three-way valve which permits the fan to draw air solely from the outside, or to apply vacuum solely to the filter, or any intermediate combination, by varying the valve position between two extremes. In a typical operation the valve is placed in a position where the fan draws air solely from the exterior (and the filter is isolated), at which point the fan is started and run up to full speed. The valve is then moved gradually (e.g. by a motor control) toward the other extreme position so that the fan progressively draws a higher proportion of air flow from the filter box. This provides a smooth readily controlled ramp in the applied vacuum even when the seals between the closure member and the filter are variable or leaky.

Figure 1:
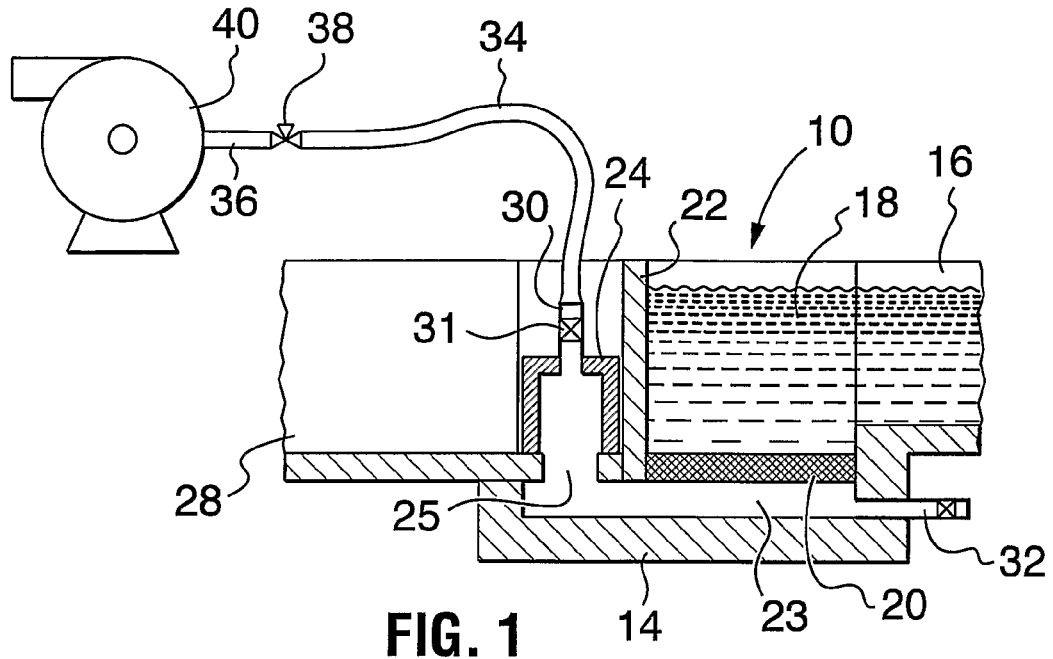
FIG. 1 is a schematic illustration in partial section of the filtration unit of the invention.
Figure 2:
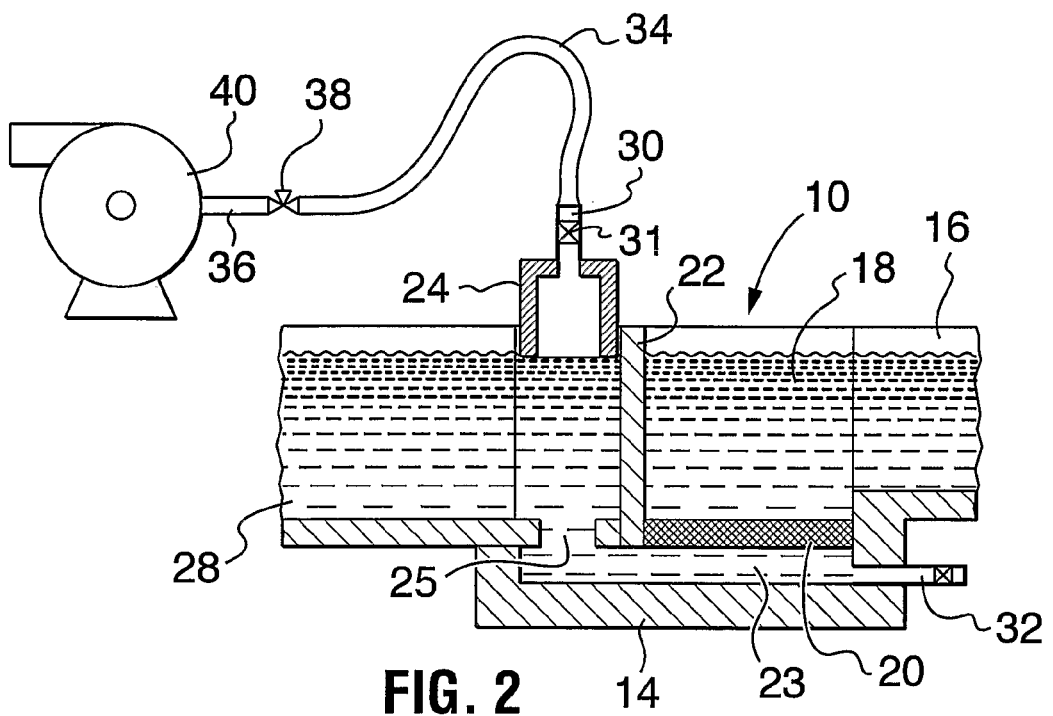
FIG. 2 is a modification of the view of FIG. 1.

A particular embodiment of a filtration unit according to the invention is shown FIGS. 1 and 2. The filtration unit includes a filtration box 10 having side walls and a bottom wall 14. These walls are formed of a heat resistant insulating material. At one side of the unit is a feed trough 16 for feeding molten metal 18 into the box. Within the box is a horizontal filter element 20 supported between side walls and an inner divider wall 22. An exit well 23 is provided beneath the filter 20 and a closeable outlet drain 32 is provided for emptying the filter box when necessary.

The exit well 23 includes an outlet opening 25 through which molten metal discharges to trough 28. For priming the filter 20, the opening 25 and exit well 23 are closed by means of a closure unit 24 which, as shown in FIG. 1, sits over and seals the outlet opening 25. An opening in closure member 24 connects to a conduit 34 by way of a connector 30 and conduit 34 connects to a fan intake duct 36 containing a valve 38. This valve 38 can be moved between a position allowing flow through conduit 34 to the pump intake duct 36 or it can be switched to draw air in from the atmosphere by means of a motor drive. The valve 38 is such that at any position between these two extremes, the fan can draw a portion of air from the atmosphere and the remainder from the conduit 34. The connector 30 has a fast acting solenoid valve 31 connected to the atmosphere.

In the position shown in FIG. 1, the filter unit is initially filled with molten metal 18 as shown and the fan 40 is started with the valve 38 fully open to the atmosphere and the conduit 34 shut off from the fan. The valve 38 is moved by a motor drive toward its other extreme in order to gradually increase the proportion of air flow coming from the exit well 23 thereby creating a vacuum within the space beneath the filter. This vacuum quickly and smoothly increases by the action of fan 40 and valve 38 until the point is reached at which metal flow commences through the filter 20 and priming has been achieved. At this point it is important to quickly release the vacuum and this is done by opening valve 31 to the atmosphere. To achieve a rapid release of vacuum the valve 31 is preferably a solenoid valve that is released upon detection of molten metal in the bottom of the well 23, for example, by means of a conductive probe which detects the metal by completion of an electric circuit.

Once the vacuum is released, the closure 24 is lifted away from the filter box as shown in FIG. 2 so that the entire open end of exit well 23 is exposed to the atmosphere, and, of course, this also opens the discharge trough 28 to metal flow.

Figure 3:
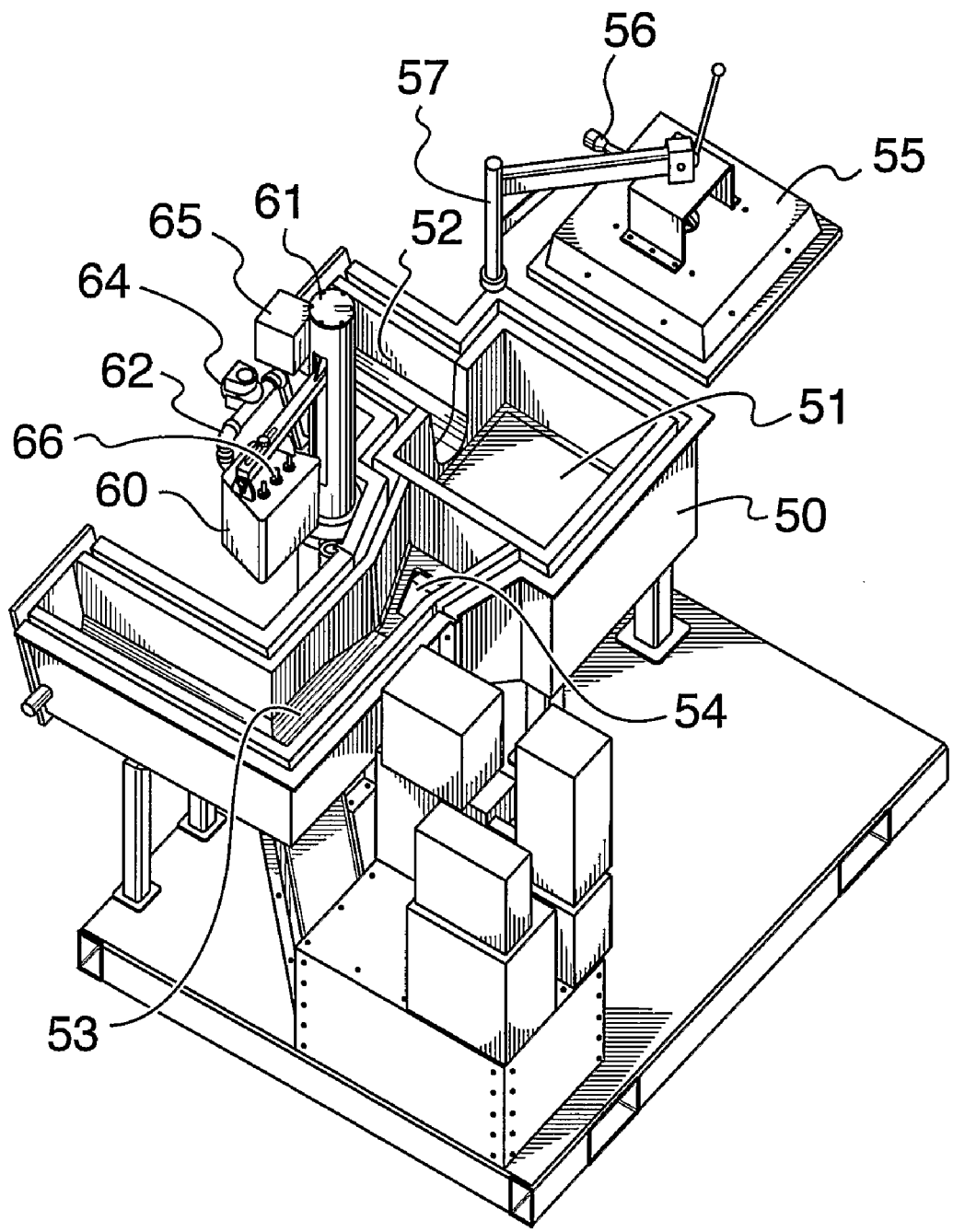
FIG. 3 is a perspective view of the filtration unit of the invention.
Figure 4:
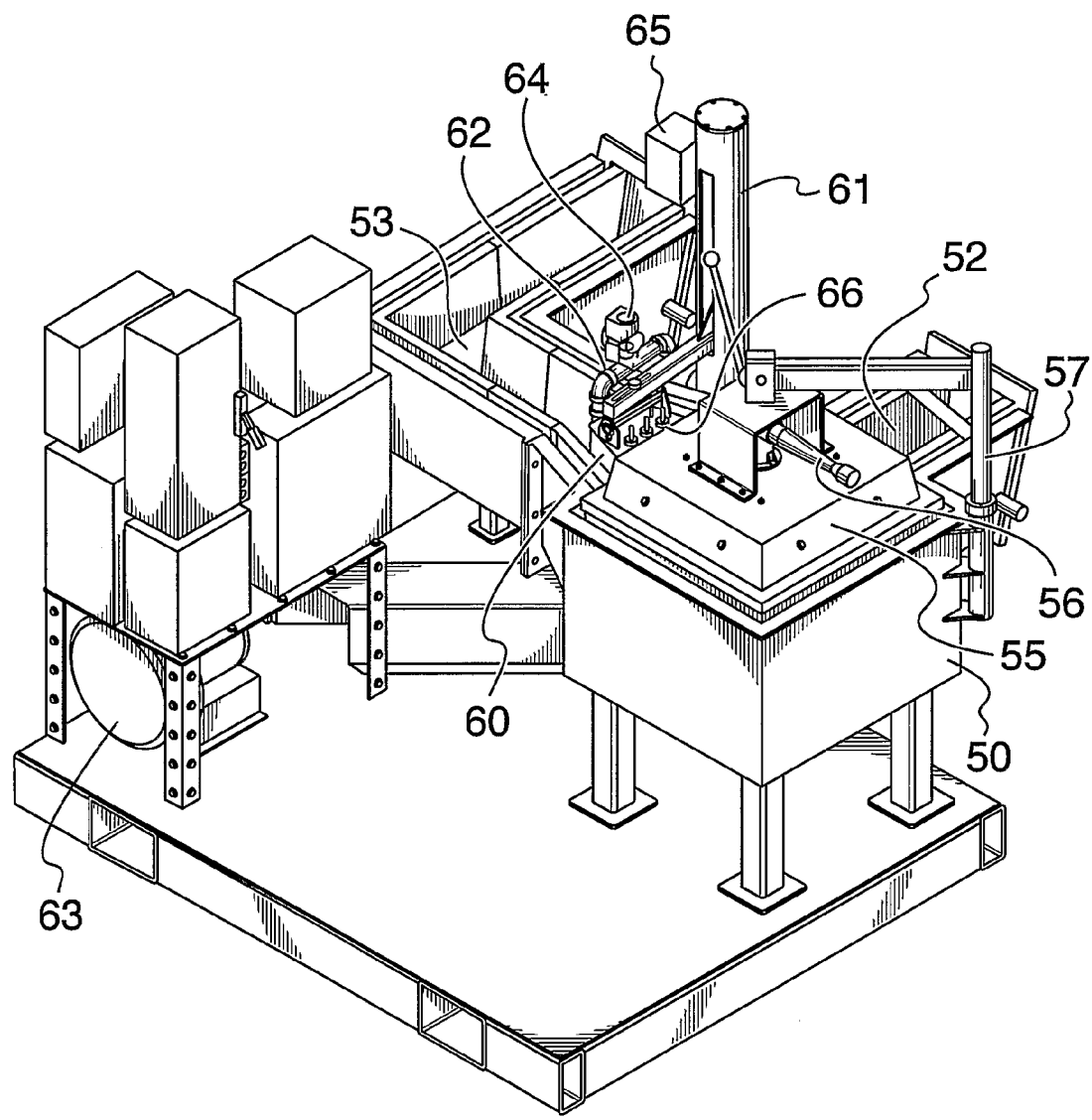
FIG. 4 is a further perspective view of the filtration unit of FIG. 3 from a different direction.

A more detailed version of the present invention is shown in perspective views in FIGS. 3 and 4. A refractory lined filter box 10 typical of the size and type used for commercial ceramic foam filtration units is provided. A porous filter element 20 is mounted substantially horizontally within the box. By this we mean that the filter element is mounted within about 10 degrees of the horizontal. This provides, for example, for release of trapped gases. An inlet 16 and outlet 28 comprising refractory lined troughs are provided that are in turn connected to a conventional metal delivery system.

Below the filter element, and not visible in FIGS. 3 and 4 in the exit well 23 connecting to outlet opening 25, as shown in FIGS. 1 and 2.

A removable cover 41 is provided for the filter box. The cover contains a burner 42 for preheating the filter element prior to use. The cover is mounted on a vertical post 43 and can be raised and swung out of the way when not required.

A closure 24 in the form of a hollow box with an open bottom is provided mounted on a post 44 so that it can be moved into position and lowered into the exit trough 28 so as to cover and seal the hole 25 and thereby seal off the exit well 23 under the filter element. The closure box 24 is connected by pipe 34 to a fan 40. Mounted on the connection pipe 34 and close to the closure is a quick opening solenoid valve 45 to release vacuum when the metal is detected in the exit well. The closure can be raised automatically (when metal is detected) by pneumatic means controlled by a controller 46 on the post. Metal is detected by electrical contacts 47 fed through the closure. These are in the form of steel or graphite tipped steel rods.

The priming is conducted within a time of about of 1 to 120 seconds, preferably in a time of about 2 to 30 seconds. This is with a filter having a filtration cross sectional area of about 25.8 to 10130 square centimeters (4 to 1570 square inches). The filtration area preferably is at least 645 square centimeters (100 square inches). This filter also typically has a thickness of about 1.25 to 10.2 centimeters (0.5 to 4.0 inches), preferably about 2.5 to 7.6 centimeters (1 to 3 inches).

The filter used can be selected from a variety of commercial filters and typically has a filter pore size ranging from an average of about 150 to 500 microns. This average pore size is defined as the average "window" or size of interconnecting necks or passages between the cells of the porous refractory media.

Figure 5:
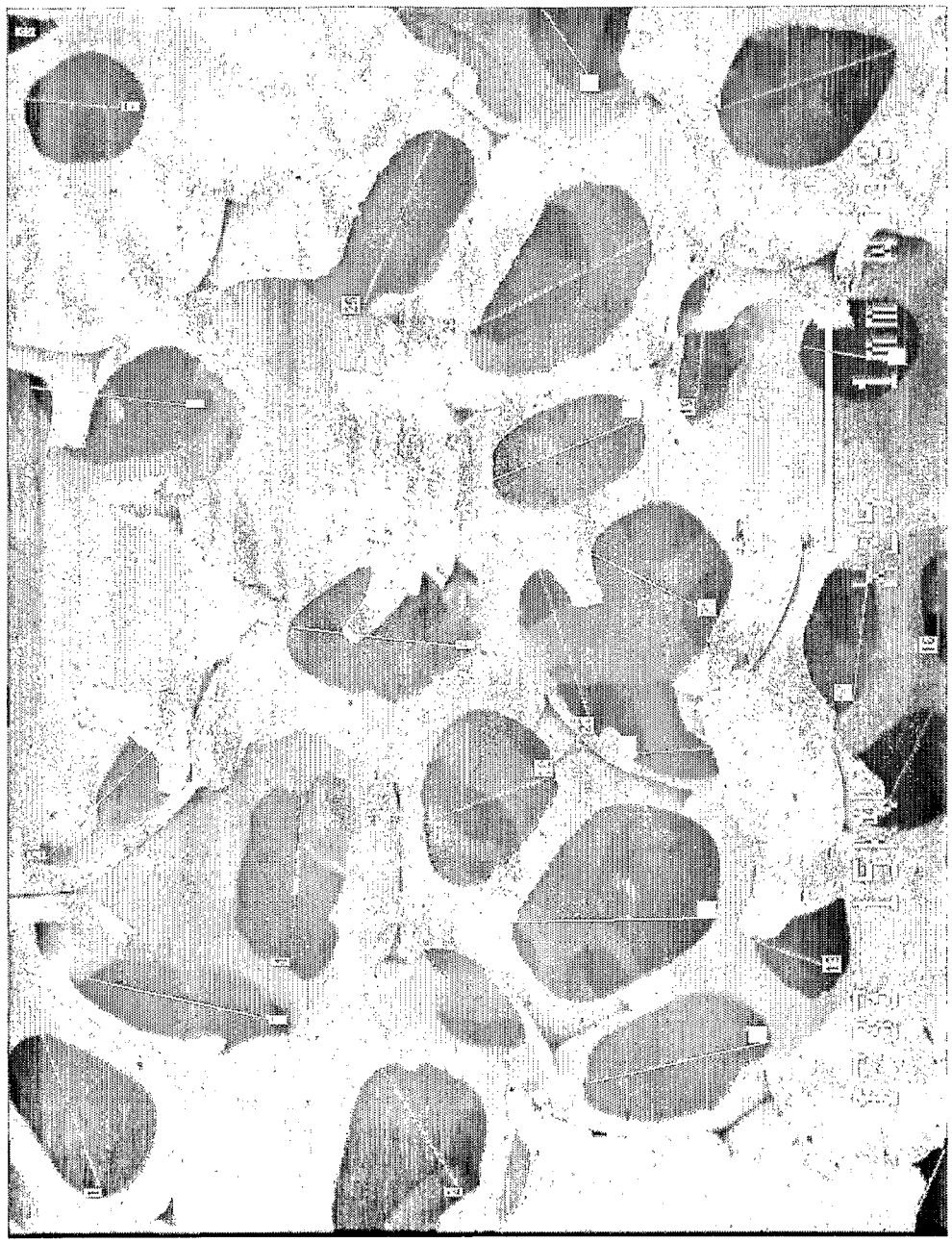
FIG. 5 is a micrograph showing how pore diameters are measured.

The average pore size is measured as follows. A sample is cut from the filter media in the centre of the media thickness and perpendicular to the flow direction. From a scanning electron micrograph of the sample, the size of the "windows" visible between the ceramic necks is measured and the average value over the sample is determined. FIG. 5 shows a typical result for such measurements. Pores that have a diameter below 50% of the average of all pores measured are not taken into account in the final average pore size calculation because they will not be primed by molten metal.

Filters having an average pore size greater than 500 microns typically can be started without the need of priming, while filters having an average pore size below 150 microns may be capable of being primed by applying a vacuum to the exit well, but will require an excessive head of metal above the filter to continue the filtration without the vacuum.

Filters of this type are conventionally defined in terms of pore per inch (ppi), but this parameter is not a unique definition of average pore size since it depends on the manufacturing methods used. For comparison, certain commercial filter media are listed in Table 1 below:

TABLE 1

| Media designation | Average pore size ("Window") |
|---|---|
| Selee 30 PPI PBA | 840 microns |
| Vesuvius 30 PPI Sintered Alumina | 690 microns |
| Sivex 30 PPI PBA | 930 microns |
| Vesuvius 50 PPI Sintered Alumina | 590 microns |
| Drache 60 ppi low PBA | 450 microns |
| Selee 70 PPI PBA | 380 microns |
| Drache 70 ppi low PBA | 350 microns |

TABLE 1-continued

| Media designation | Average pore size ("Window") |
|---|---|
| Vesuvius 80 PPI Sintered Alumina | 240 microns |
| Sivex 80 PPI PBA | 390 microns |

The first four items in the above table are filter materials that are typically used in low depth CFF boxes for filtering metal in commercial casting plants. The last five materials are not used in conventional systems unless very high metal heads can be provided for priming. They are typical of the filter media that may be conveniently used with the present invention.

The depth of metal over the filter is defined as the sum of the vertical distance from the trough bottom to filter top (VDTF) plus the height of the metal in the trough. The height of metal in the trough would generally range from about 20 to 30 cm (8 to 12 inches). With the procedure of the present invention, the VDTF typically ranges from about 0 to 10 cm (0 to 4 inches) and, therefore, the depth of metal over the filter will typically be about 20 to 40 cm (8 to 16 inches). In a typical filter, the VDTF ranges from 0 to 50 cm (0 to 20 inches) and therefore the depth of metal over the filter will be from 20 to 80 cm (8 to 32 inches).

Thus it can be seen that the filter box size (i.e. the filter cross section and depth required to accommodate the metal head over the filter) can be less in the present invention than in conventional ceramic filtration equipment or can be installed in substantially the same space as an existing conventional ceramic filter. Furthermore, since a low average pore size medium is used in the present invention, the filtration efficiency is higher than in conventional ceramic filters and is closer to the efficiency of deep bed filters which occupy substantially larger volumes. The smaller volume of the present invention compared to both conventional ceramic filter units and bed filters means that less metal must be drained at filter change.

The invention has been shown with a single filter element mounted in the filter box. However, it will be understood that other configurations known in the art may be used with the invention. For example, the single filter element may be replaced by two or more, mounted beside each other to permit larger cross-sectional areas than may be possible with a single element. In addition, use of two filter elements mounted one above the other in the filter box (for example as illustrated in U.S. Pat. No. 5,673,902 assigned to Selee Corporation) is possible with this invention.

Example 1

A test was conducted on a pilot filtration unit of a design as shown in FIG. 1. The filter used was a commercially available filter having a pore density of 70 pores per inch (PPI). It had a thickness of 5.1 cm (2 inches) and a cross-sectional area of 929 square centimeters (144 square inches). The exit well was connected by way of a conduit to the intake of a duct fan (Spencer VB-055 manufactured by The Spencer Turbine Company, Windsor, Conn. USA), the conduit including a venting valve and a three-way valve for bleeding atmospheric air into the air being drawn into the fan.

Figure 6:
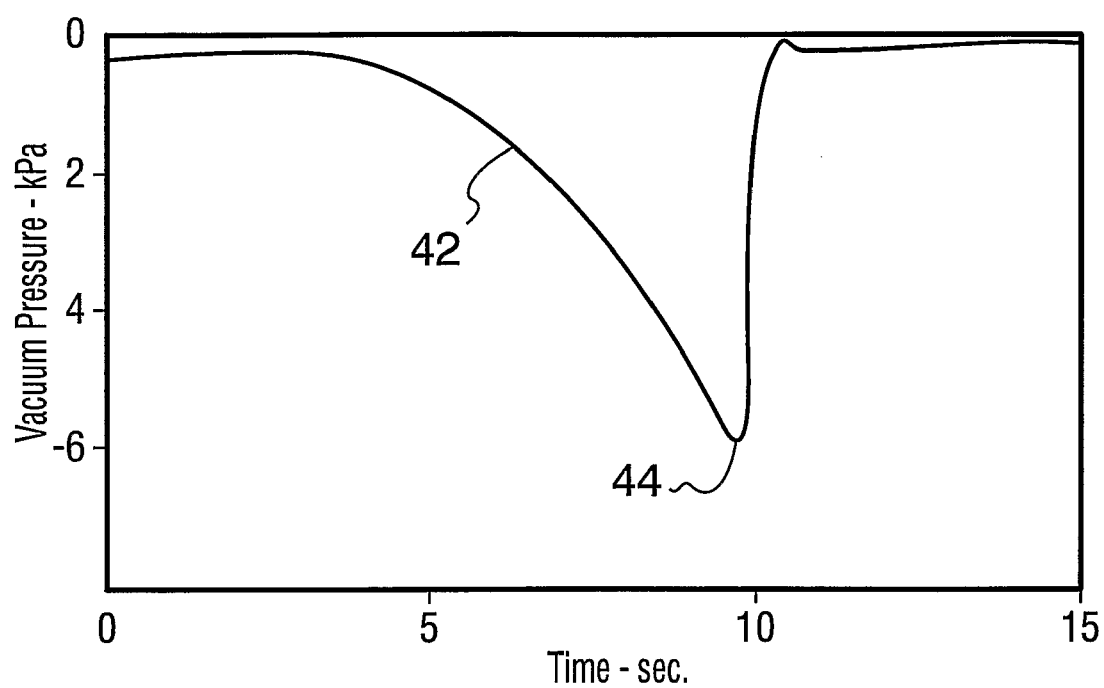
FIG. 6 is a plot showing increase in vacuum with time.

Molten aluminum alloy was added to the filtration unit to a depth of about 20 cm (8 inches) above the filter. With the exit well and molten metal outlet trough closed, the fan was started and a three-way valve progressively moved by a motor to draw an increasing proportion of air from the exit well and a decreasing proportion of air from the atmosphere. The filter is primed within about 10 seconds, at which point the vacuum had reached a level of about 6 kPa. At this point the venting valve in the conduit was opened and the exit well and molten metal outlet were also immediately opened. The results are shown in the graph in FIG. 6 where line 42 shows a steadily decreasing pressure and the point 44 indicates the point at which metal is detected in the bottom of the exit well 26 showing that priming has been achieved.

The invention claimed is:

1. A method of priming an in-line molten metal filtration unit having a porous ceramic or refractory filter mounted substantially horizontally in a filter box having an inlet for molten metal and an outlet for molten metal, the outlet being a closeable outlet in an exit well connecting to the downstream side of the filter, the method comprising the steps of adding sufficient molten metal to the filter box to fully cover the upstream side of the filter with a depth of molten metal, temporarily closing the molten metal outlet in the exit well with a sealable cover, applying a steadily increasing vacuum to the closed chamber at a rate between 0.1 and 10 kPa per second by withdrawing a stream of air from the exit well through a fan or air venturi until the molten metal begins to flow through the filter and then immediately releasing the vacuum and removing the sealable cover from the molten metal outlet.

2. A method as claimed in claim 1 wherein the stream of air is withdrawn from the exit well by means of a fan.

3. A method as claimed in claim 1 wherein the stream of air is withdrawn from the exit well by means of an air venturi.

4. A method as claimed in claim 2 wherein the fan is connected to the exit well of the filter box by way of a conduit having a valve for venting to the atmosphere and the vacuum is released by opening this valve to the atmosphere.

5. A method as claimed in claim 4 wherein the conduit is connected to the sealable cover and when the vacuum is to be released the sealable cover is removed from the exit well and molten metal outlet.

6. A method as claimed in claim 4 wherein the conduit also includes a three way valve for bleeding atmospheric air into the air stream being drawn into the fan.

7. A method as claimed in claim 6 wherein the vacuum is applied within a time of about 1 to 120 seconds.

8. A method as claimed in claim 7 wherein the time is about 2 to 30 seconds.

9. A method as claimed in claim 7 wherein the filter has a filtration area of about 25 to 10130 square centimeters (4 to 1570 square inches).

10. A method as claimed in claim 9 wherein the filtration area is at least 645 square centimeters (100 square inches).

11. A method as claimed in claim 7 wherein the filter has a thickness of about 1.25 to 10.2 centimeters (0.5 to 4.0 inches).

12. A method as claimed in claim 11 wherein the thickness of the filter is about 2.5 to 7.6 centimeters (1 to 3 inches).

13. A method as claimed in claim 11 wherein the filter has an average pore size of about 150 to 500 microns.

14. An apparatus for filtering molten metal comprising a filter box, a feed trough for feeding molten metal into the filter box, a porous ceramic or refractory filter mounted substantially horizontally within the filter box to receive molten metal from the feed trough, an exit well beneath the filter for receiving filtered molten metal, said exit well extending laterally beyond the filter box and beneath a bottom portion of a discharge trough, said trough bottom portion having an opening connecting the discharge trough to the exit well, a vertically movable closure unit adapted to sit over and seal the opening between the discharge trough and exit well, an air conduit connected at a first end to the closure unit and at a second end to a fan or air venturi for withdrawing air from the exit well, a valve for releasing vacuum formed in the exit well and means for raising and lowering the closure unit.

15. An apparatus as claimed in claim 14 wherein the air conduit second end is connected to the intake of a fan.

16. An apparatus as claimed in claim 15 wherein the air conduit second end includes a three-way valve for bleeding atmospheric air into the air in the conduit being withdrawn from the exit well.

17. An apparatus as claimed in claim 15 wherein the fan is adapted to apply a steadily increasing vacuum to the closed chamber at a rate between 0.1 and 10 kPa per second.

18. An apparatus as claimed in claim 15 wherein the vacuum-releasing valve is connected to the vertically movable closure unit.

19. An apparatus as claimed in claim 18 wherein the vertically movable closure unit includes electrical contacts extending from the bottom thereof for detecting the presence of molten metal.

20. An apparatus as claimed in claim 14 wherein the filter box includes a removable cover.

21. An apparatus as claimed in claim 14 wherein the filter has a filtration area of about 25 to 10130 square centimeters (4 to 1570 square inches).

22. An apparatus as claimed in claim 14 wherein the filtration area is at least 645 square centimeters (100 square inches).

23. An apparatus as claimed in claim 14 wherein the filter has a thickness of about 1.25 to 10.2 centimeters (0.5 to 4.0 inches).

24. An apparatus as claimed in claim 14 wherein the thickness of the filter is about 2.5 to 7.6 centimeters (1 to 3 inches).

25. An apparatus as claimed in claim 14 wherein the filter has an average pore size of about 150 to 500 microns.

* * * * *

UNITED STATES PATENT AND TRADEMARK OFFICE
CERTIFICATE OF CORRECTION

PATENT NO. : 7,666,248 B2 Page 1 of 1
APPLICATION NO. : 10/590472
DATED : February 23, 2010
INVENTOR(S) : Luc Belley et al.

It is certified that error appears in the above-identified patent and that said Letters Patent is hereby corrected as shown below:

Title Pg, Item (86) PCT No.: under the related U.S. Patent Documents section, please list --US 60/547,755, filed February 24, 2004--.

Signed and Sealed this

First Day of June, 2010

David J. Kappos
*Director of the United States Patent and Trademark Office*